G. STREICH.
LUMBER CART.
APPLICATION FILED APR. 20, 1909.
937,657.
Patented Oct. 19, 1909.
3 SHEETS—SHEET 2.
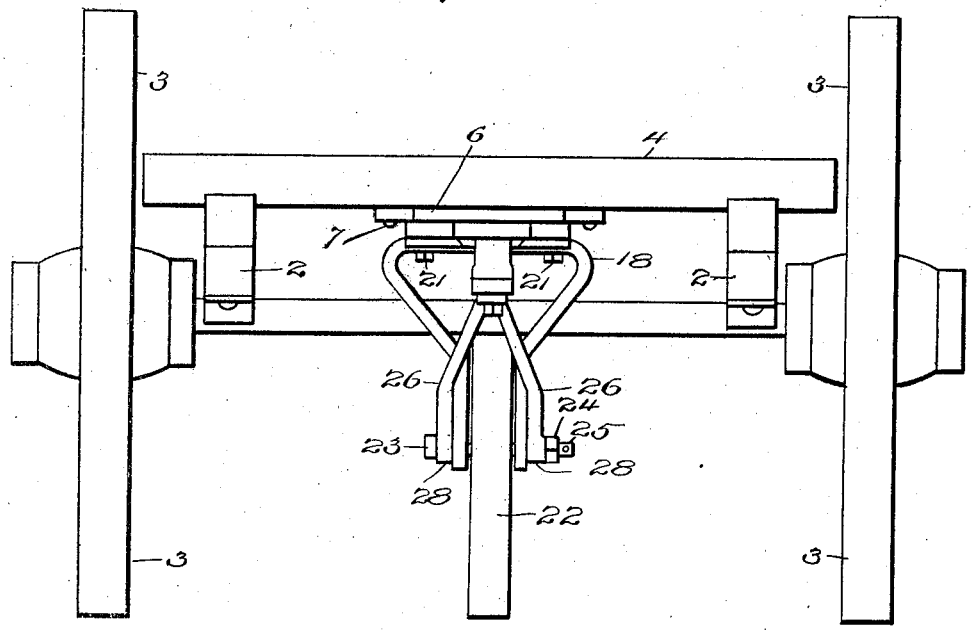
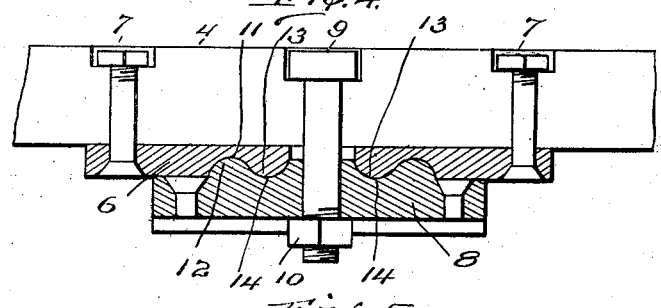
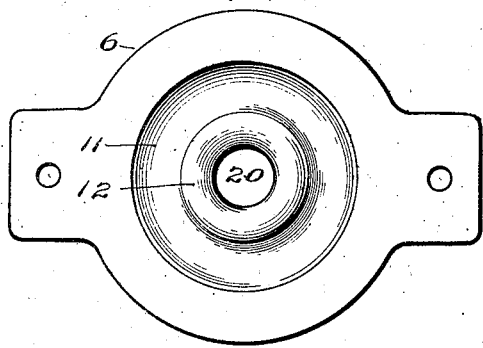
Witnesses
S. L. Richmond
L. Cloud Newman
Inventor
Gabriel Streich
By Mason Fenwick & Lawrence
Attorneys

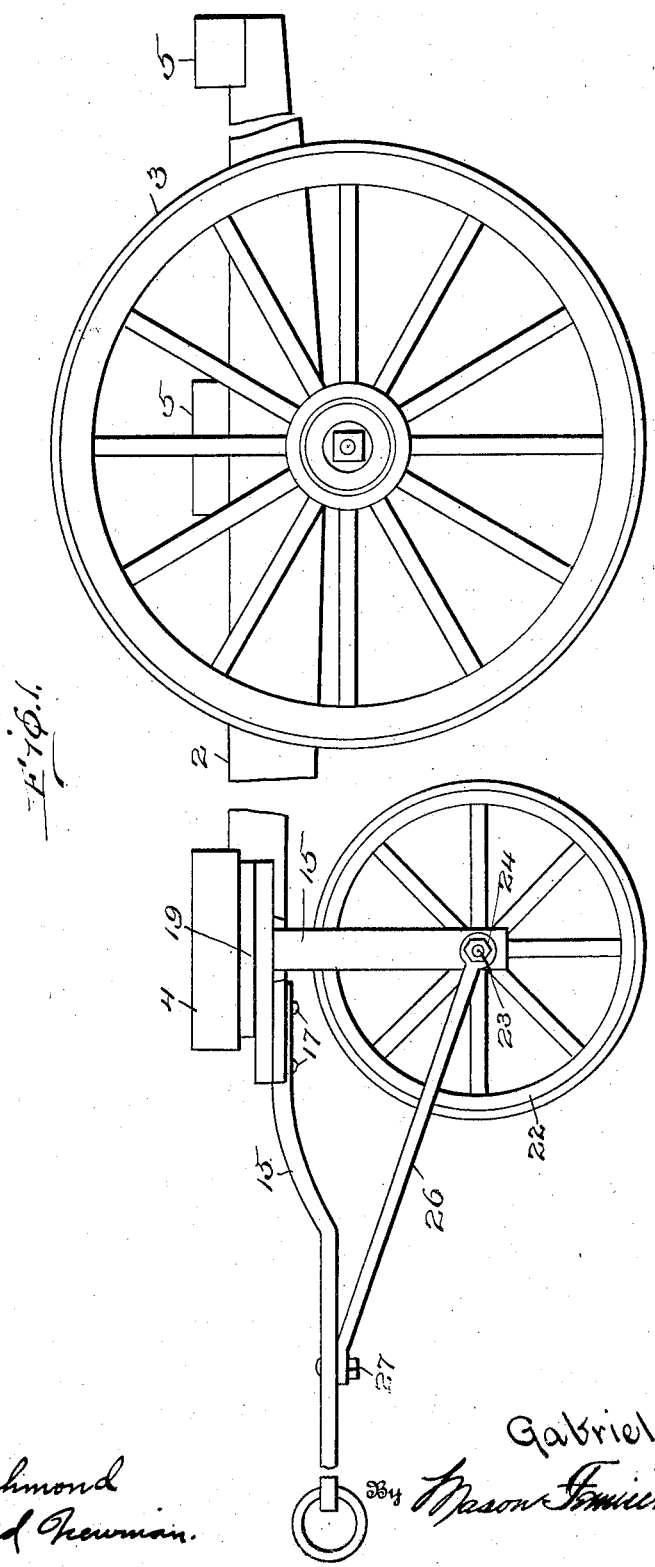

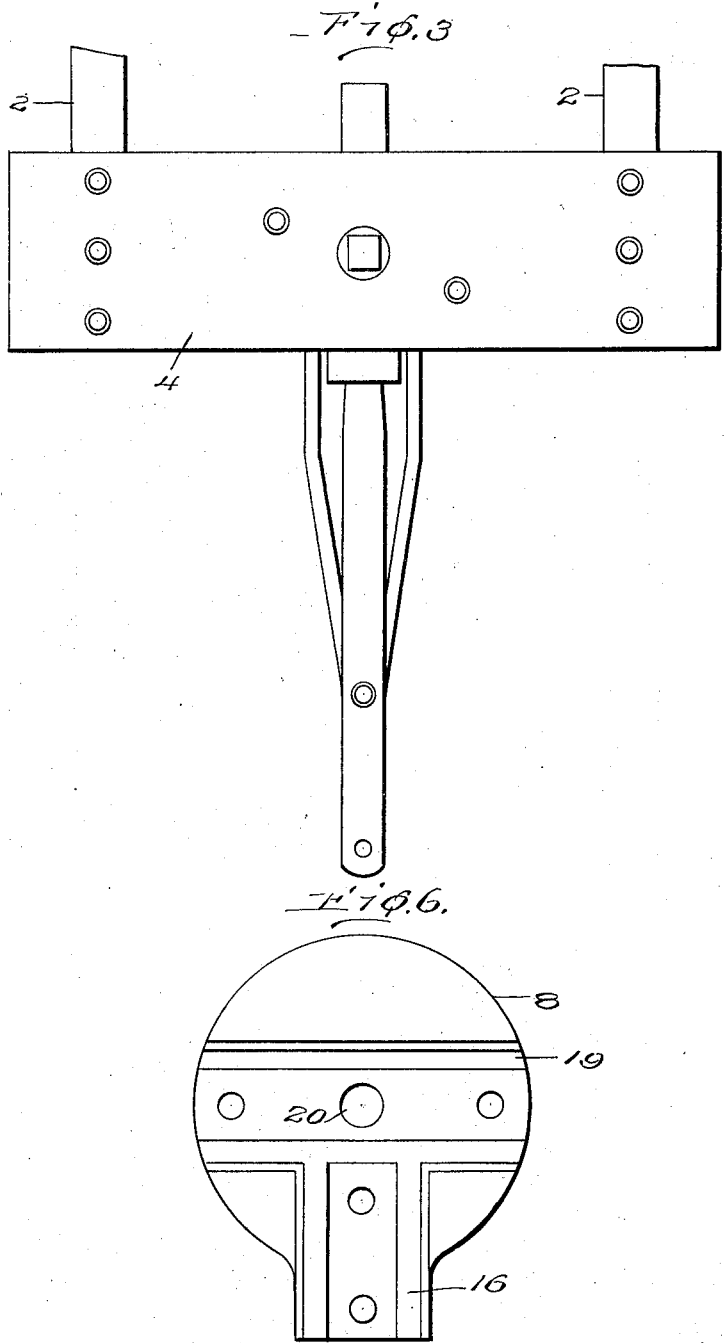

UNITED STATES PATENT OFFICE.

GABRIEL STREICH, OF OSHKOSH, WISCONSIN.

LUMBER-CART.

937,657.

Specification of Letters Patent.   Patented Oct. 19, 1909.

Application filed April 20, 1909. Serial No. 491,083.

*To all whom it may concern:*

Be it known that I, GABRIEL STREICH, citizen of the United States, residing at Oshkosh, in the county of Winnebago and State of Wisconsin, have invented certain new and useful Improvements in Lumber-Carts, of which the following is a specification.

My invention relates to improvements in lumber-carts of the three wheel type, and the object of my invention is to provide a cart that can be shipped knock down and quickly and readily re-assembled without expert knowledge.

A further object of my invention is to provide for an easy and quick take-apart of the members.

My invention relates essentially to the front or single wheel and connections.

Lumber carts of this class have heretofore been constructed with frame, rear axle, and wheels mounted upon each end of the rear axle and a single wheel in front.

My invention provides a simple form of turn table in front that can readily be lubricated, a king-bolt, and an axle for the front wheel that can be easily adjusted.

In the accompanying drawing Figure 1 represents a side view and Fig. 2 a front view of the lumber-cart, Fig. 3 represents a top view of the front end, Fig. 4 represents a vertical section across the front beam, Fig. 5 a plan view of the bottom of the top plate and Fig. 6 the same of the bottom plate or turn-table.

Referring to the drawing by numerals, 2, 2 represent side beams and 5, 5 crossbeams constituting the frame of the cart, and 3, 3 represent the rear wheels.

4 represents the front beam which is bolted to the side beams 2, 2.

The top plate 6 is bolted to the front beam 4 underneath by the bolts 7, 7 and rides the bottom plate 8 constituting the turn-table. The king-bolt 9 passes through the beam 4 and through central openings 20, 20 in the plates 6, and 8 being secured by the nut 10.

The plates 6 and 8 are provided with circular corrugations corresponding with each other. The circular depression 11 in the top plate 6 rides the circular projection 12 in the bottom plate 8 and the circular projection 13 of the top plate 6 fits into the circular depression 14 of the bottom plate 8. The plates are fitted to each other.

The bottom plate 8 revolves with the tongue which is seated in the depression 16 and bolted to the turn-table 8 by means of the bolts 17, 17. The fork 18 is seated in the depression 19 in the bottom of the plate 8 and bolted thereto by the bolts 21, 21. The fork 18 carries the front wheel 22 and axle 23. The wheel 22 revolves on the axle 23, which consists of a steel bolt passed through eyes in the fork end and a central opening in the wheel and is secured by a nut 24 threaded thereon. A cotter-pin may be passed through the eye 25 for safety in securing the nut 24.

26, 26 represent braces secured to the tongue at 27 and having eyes at the opposite ends 28, 28 surrounding the bolt 23.

In taking the above described lumber cart apart for shipment it is only necessary to remove the rear wheels, the king-bolt 9 and bolt 23 constituting the axle. The braces 26, 26 and the fork 18 may then be easily detached by removing the nuts securing them. The front wheel and axle may be easily removed and new ones supplied in case of repairs. All parts may be easily secured and adjusted and a lubricant may be supplied between the plates 6 and 8.

Having thus described my invention, what I claim is:—

1. A lumber cart comprising in its construction a body frame carrying a rear axle, wheels mounted on said axle, a rider-plate attached beneath the front beam of the frame and provided with circular corrugations, a turn-plate oppositely corrugated, a front wheel fork attached to the turn-plate, an axle-pin extending through eyes in the prongs of the fork, a front wheel mounted upon the axle-pin, a tongue attached to the turn plate, braces attached to the tongue on each side and having eyes at the opposite ends, adapted to surround the axle-pin, and a king-bolt adapted to secure the turn-plate and the rider-plate and beam in their proper relation, substantially as shown and described.

2. A lumber cart comprising a body frame carrying a rear axle, wheels mounted on the axle, a rider plate attached to the under side of the front beam and provided with circular corrugations, a turn-plate having on one side circular corrugations mating with those on the rider plate, and on its other side with two seats disposed at right angles to each other, a front wheel fork engaging one of the seats, an axle pin extending through the eyes of the forked members, a front wheel mounted upon the axle pin, a tongue engaging the other seat in the turn plate, and a king bolt adapted to secure the turn plate, rider plate and beam in their proper relation.

In testimony whereof I affix my signature, in presence of two witnesses.

GABRIEL STREICH.

Witnesses:
M. H. BYRNE,
A. R. WATERHOUSE.